United States Patent [19]

Taniguchi et al.

[11] Patent Number: 4,927,243

[45] Date of Patent: May 22, 1990

[54] METHOD AND APPARATUS FOR DRIVING OPTICAL MODULATION DEVICE

[75] Inventors: Osamu Taniguchi, Chigasaki; Yoshihiro Onitsuka, Yokohama; Tadashi Mihara, Atsugi, all of Japan

[73] Assignee: Canon Kabushiki Kaisha, Tokyo, Japan

[21] Appl. No.: 116,244

[22] Filed: Nov. 3, 1987

[30] Foreign Application Priority Data

Nov. 4, 1986 [JP] Japan ................................ 61-262460

[51] Int. Cl.5 ................................................ G02F 1/13

[52] U.S. Cl. ................................ 350/350 S; 350/333; 340/784

[58] Field of Search .................... 350/350 S, 333, 332; 340/805, 784

[56] References Cited

U.S. PATENT DOCUMENTS

| | | | |
|---|---|---|---|
| 4,591,886 | 5/1986 | Umeda et al. | 350/350 S |
| 4,638,310 | 1/1987 | Ayliffe | 350/333 |
| 4,655,550 | 4/1987 | Crossland et al. | 350/350 S |
| 4,655,561 | 4/1987 | Kanbe et al. | 350/333 |
| 4,697,887 | 10/1987 | Okada et al. | 350/350 S |
| 4,701,026 | 10/1987 | Yazaki et al. | 350/333 |
| 4,705,345 | 11/1987 | Ayliffe et al. | 350/350 S |
| 4,715,688 | 12/1987 | Harada et al. | 350/350 S |
| 4,728,947 | 3/1988 | Ayliffe et al. | 340/784 |
| 4,738,515 | 4/1988 | Okada et al. | 350/350 S |
| 4,765,720 | 8/1988 | Toyono et al. | 350/350 S |
| 4,770,502 | 9/1988 | Kitazima et al. | 350/350 S |
| 4,836,656 | 6/1989 | Mouri et al. | 350/350 S |

OTHER PUBLICATIONS

Yoshino et al.-"Electro-Optical Effect in Ferroelectric Smectic L. C." Japan J. Appl. Phys. vol. 17-No. 13-1978-pp. 597-598.

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

In an optical modulation device, a matrix of pixels are formed at intersections of scanning lines and data lines so as to assume either a first optical state or a second optical state. In a first phase, a voltage $V_R$ of one polarity is applied to the pixels on a selected scanning line to provide the first optical state. In a second phase, the pixels on the selected scanning line are selectively supplied with a voltage $V_B{}^2$ of the other polarity inverting the first optical state to the second optical state or a voltage $V_B{}^1$ of the other polarity not changing the first optical state. Herein, the minimum of the durations of single-polarity voltages is defined as Δt, and a voltage at which the optical conversion from the first to the second optical state or vice versa is saturated based on the minimum application time Δt is defined as a saturation threshold voltage Vsat. Then, the application time of the voltage $V_R$ exceeds the minimum application time Δt, and a pixel supplied with the voltage $V_B{}^1$ in the second phase is supplied with a voltage $V_R$, the maximum amplitude of which does not exceed the saturation threshold voltage Vsat in terms of absolute values, in the first phase.

15 Claims, 9 Drawing Sheets

METHOD AND APPARATUS FOR DRIVING OPTICAL MODULATION DEVICE

FIELD OF THE INVENTION AND RELATED ART

The present invention relates to a method and an apparatus for an optical modulation device in which contrast is discriminatable depending on the direction of an electric field applied thereto, such as a ferroelectric liquid crystal device.

Clark and Largerwall have proposed a type of display device in which the refractive anisotropy of ferroelectric liquid crystal molecules are utilized and combined with polarizing means to control transmitted light (Japanese Laid Open patent application No. 107216/1981; U.S. Pat. No. 4,367,924, etc.). Such a ferroelectric liquid crystal generally assumes chiral smectic C phase (SmC*) or H phase (SmH*) in a specific temperature range, and in this state, shows bistability, i.e., a property of assuming either a first optically stable state or a second optically stable state in response to an electric field applied thereto and retaining the state in the absence of an electric field. Such a ferroelectric liquid crystal device also shows a quick response to a change in electric field, and the wide utilization thereof as a high-speed and memory-type display device has been expected.

In a ferroelectric liquid crystal device as described above, image information is written by using a driving method as disclosed, e.g., by U.S. Pat. No. 4655561. According to the U.S. Patent, writing by line-sequential scanning is effected for a ferroelectric liquid crystal device having a matrix electrode structure comprising a plurality of scanning lines and a plurality of signal lines intersecting with the scanning lines and forming a pixel at each intersection, by applying to all or a prescribed number of the pixels on a selected scanning line a voltage of one polarity providing one optical state (e.g., "light-transmitting state (white)") to the related pixels in a first phase, and applying to a selected pixel among the above mentioned all or a prescribed number of the pixels on the selected scanning line a voltage of the other polarity providing the other optical state (e.g., "light-interrupting state (black)") to the selected pixel in a second phase.

It is generally difficult to provide a ferroelectric liquid crystal device with a bistability condition as disclosed by Clark et al, and the device is liable to have a unistable condition. For this reason, when a display panel comprising such a ferroelectric liquid crystal device is driven by the above-described method to form a static picture, the static picture can disappear thereafter if the applied voltage is removed.

In order to solve the above problem, it is possible to apply a driving scheme wherein a period of operation (e.g., one field or frame) for sequentially applying a scanning signal to the scanning lines repeated periodically to effect line-sequential writing (referred to as "refresh driving scheme"). In other words, information signals providing a static picture are sequentially and cyclically applied to a ferroelectric liquid crystal panel, whereby the static picture can be stably retained.

However, if driving voltages are applied to a ferroelectric liquid crystal panel according to the above-mentioned first phase (line-clear phase) and second phase (writing phase) while applying the refresh driving scheme, a bias voltage of the above-mentioned one polarity is applied in effect to the liquid crystal material, whereby the liquid crystal material is deteriorated or the switching characteristic of the display panel is impaired. Further, in a case where the bias voltage is decreased, an additionally high voltage is required of the driving circuit therefor, so that the driving circuit becomes expensive.

SUMMARY OF THE INVENTION

Accordingly, a principal object of the present invention is to provide a method and an apparatus having solved the above-describe problems for driving an optical modulation device, such as a ferroelectric liquid crystal device of which contrast is discriminated depending on an electric field applied thereto.

According to the present invention, there is provided a driving method for an optical modulation device comprising a plurality of scanning lines and a plurality of data lines intersecting with the scanning lines to form a matrix of pixels each formed at an intersection of the scanning lines and the data lines, each pixel assuming either a first optical state or a second optical state depending on the direction of an electric field applied thereto; said driving method comprising:

a first phase of selecting a scanning line by applying a scanning signal and applying to all or a prescribed part of the pixels on the selected scanning line a voltage $V_R$ of one polarity providing the first optical state to said all or a prescribed part of the pixels; and a second phase of applying to said all or a prescribed part of the pixels on the selected scanning line a voltage $V_B^2$ of the other polarity inverting the first optical state to the second optical state and a voltage $V_B^1$ of the other polarity not changing the first optical state;

wherein if the minimum of the durations of single polarity voltages involved in the voltages $V_R$, $V_B^1$ and $V_B^2$ is defined as a minimum application time $\Delta t$, and a voltage at which the inversion from one or the other optical state to the other or one optical state of a pixel is saturated at the minimum application time $\Delta t$ is defined as a saturation threshold voltage Vsat; the application time of said voltage $V_R$ exceeds the minimum application time $\Delta t$, and a pixel supplied with the voltage $V_B^1$ in the second phase is supplied with a voltage $V_R$, the maximum amplitude $V_R^1$ of which does not exceed the saturation threshold voltage Vsa in terms of absolute values, in the first phase.

These and other objects, features and advantages of the present invention will become more apparent upon a consideration of the following description of the preferred embodiments of the present invention taken in conjunction with the accompanying drawings.

DESCRIPTION OF PREFERRED EMBODIMENTS

Figure 1A:
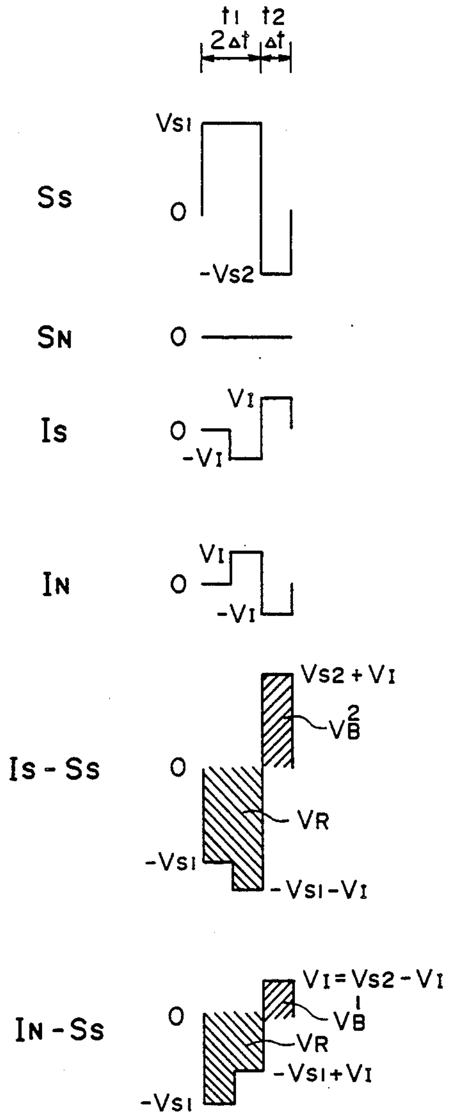
FIGS. 1A and 2A respectively show unit driving voltage waveforms used in the present invention.

FIGS. 1 and 2 are driving waveform diagrams used in the method according to the present invention. FIG. 3 is a plan view of a ferroelectric liquid crystal apparatus including a ferroelectric liquid crystal panel 31 having a matrix electrode structure and driving means therefor. Referring to FIG. 3, the panel 31 is equipped with scanning lines 32 and data lines 33 intersecting with each other, and a ferroelectric liquid crystal is disposed between the scanning lines 32 and the data lines 33 so as to form a pixel at each intersection. The scanning lines 32 are connected to a scanning circuit 34 through a scanning side drive voltage generator circuit 35. The data lines 33 are connected to a shift register 38 through a data side driving voltage generator circuit 36 and a line memory 37.

Referring to FIG. 1A, at $S_S$ is a scanning selection signal voltage applied to a selected scanning line, at $S_N$ is shown a scanning non-selection signal voltage applied to a non-selected scanning line, at $I_S$ is shown an information selection signal applied to a selected data line, and at $I_N$ is shown an information non-selection signal applied to a non-selected data line. In the same figure, at $I_S$-$S_S$ and $I_N$-$S_S$ are shown voltage waveforms applied to pixels on the selected scanning line, whereby a pixel supplied with a voltage $I_S$-$S_S$ assumes a black display state and a pixel supplied with a voltage $I_N$-$S_S$ assumes a white display state.

Figure 1B:
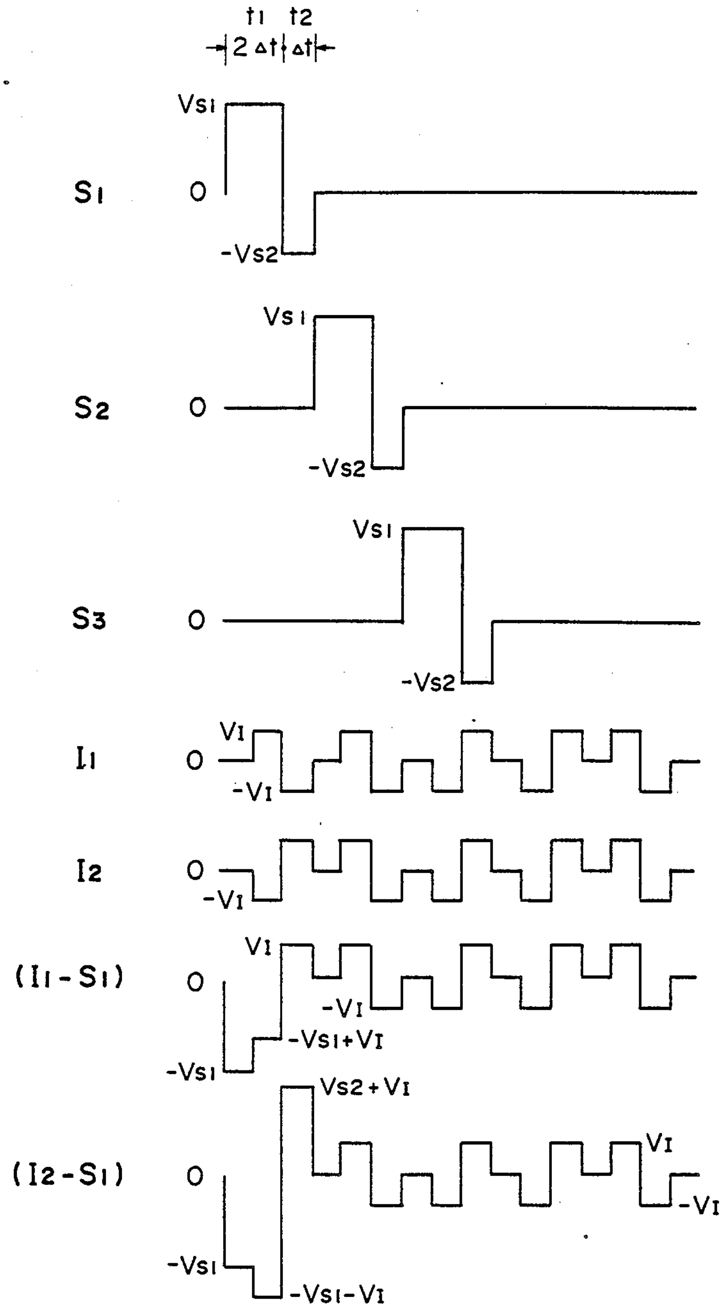
FIGS. 1B and 2B show time-serial driving voltage waveforms including the unit driving voltage waveforms.

FIG. 1B shows time-serial voltage waveforms for providing a display as shown in FIG. 3 by using driving waveforms shown in FIG. 1A.

In the driving embodiment shown in FIGS. 1A and 1B, the minimum or unit application time $\Delta t$ of a single-polarity voltage applied to a pixel on a selected scanning line corresponds to the period of a writing phase $t_2$, and the period of a line clear phase $t_1$ is set to $2\Delta t$. In the present invention, it is possible to set the period of the line clear phase $t_1$ to $2\Delta t$ to $10\Delta t$, but it is particularly suitable to set the period of $t_1$ to $2\Delta t$ as shown in the figure. Further, in the driving embodiment shown in FIGS. 1A and 1B, a maximum amplitude $V_R^1(=|-V_S|)$ of a voltage $V_R$ applied to a pixel $I_N$-$S_S$ in the line clear phase $t_1$ and a saturation threshold voltage Vsat based on the minimum application time $\Delta t$ satisfy a relationship of $V_R^1 \leqq |\text{Vsat}|$. It is further preferred that the maximum amplitude satisfies a relationship with an inversion threshold voltage $V_{th}$ based on the minimum application time $\Delta t$ of $V_R^1 \leqq |\text{Vth}|$, particularly preferably a relationship of $1/3 \cdot |\text{Vsat}| \leqq V_R^1 \leqq |V_{th}|$.

Further, in the driving embodiment shown in FIGS. 1A and 1B, the maximum amplitude $|V_{S2}+V_1|$ of a voltage $V_B^2$ and the maximum amplitude of $V_{S1}$ are set to exceed the saturation threshold voltage Vsat based on the minimum application time $\Delta t$ in terms of absolute values. Further, the maximum amplitude $|V_1|$ of a voltage $V_B^1$ is set not to exceed the inversion threshold voltage based on the minimum application time $\Delta t$.

In the embodiment shown in FIGS. 1A and 1B, the scanning selection signal at $S_S$ applied to a selected scanning line is an alternating voltage having voltages of $V_{S1}$ and $-V_{S2}$ (the polarities is determined with respect to the voltage level of a non-selected scanning line as the standard), and the $V_{S1}$ and $V_{S2}$ are set to satisfy $|V_{S1}|=|-V_{S2}|\cdot 3/2$. It is generally possible in the present invention to set these values to satisfy $|V_{S1}| \geqq |-V_{S2}|$.

As a result, in the present invention, the maximum amplitude $V_R^1$ of the voltage $V_R$ applied to the pixel $I_N$-$S_S$ applied in the line clear phase $t_1$ may be set to not less than two times or not less than three times the maximum amplitude $|V_1|$ of the voltage $V_B^1$, preferably two or three times the maximum amplitude $|V_1|$. On the other hand, the maximum amplitude $V_R^2$ of the voltage $V_R$ applied to a pixel $I_S$-$S_S$ in the line clear phase $t_1$ may be set to an amplitude which is equal to or larger than the maximum amplitude $|V_{S2}+V_2|$ of the voltage $V_B^2$ applied in the writing phase $t_2$. Further, in the present invention, the maximum amplitude of the voltage $V_B^2$ may be set to not less than two times or not less than three times, preferably two or three times, the maximum amplitude of the voltage $V_B^1$.

In a preferred embodiment of the present invention, a step of sequential writing by using the driving waveforms shown in FIGS. 1A and 1B on the respective scanning lines (the period of this step may be taken as one frame period or one field period) is repeated periodically, whereby a static picture or motion picture may be displayed.

Figure 6:
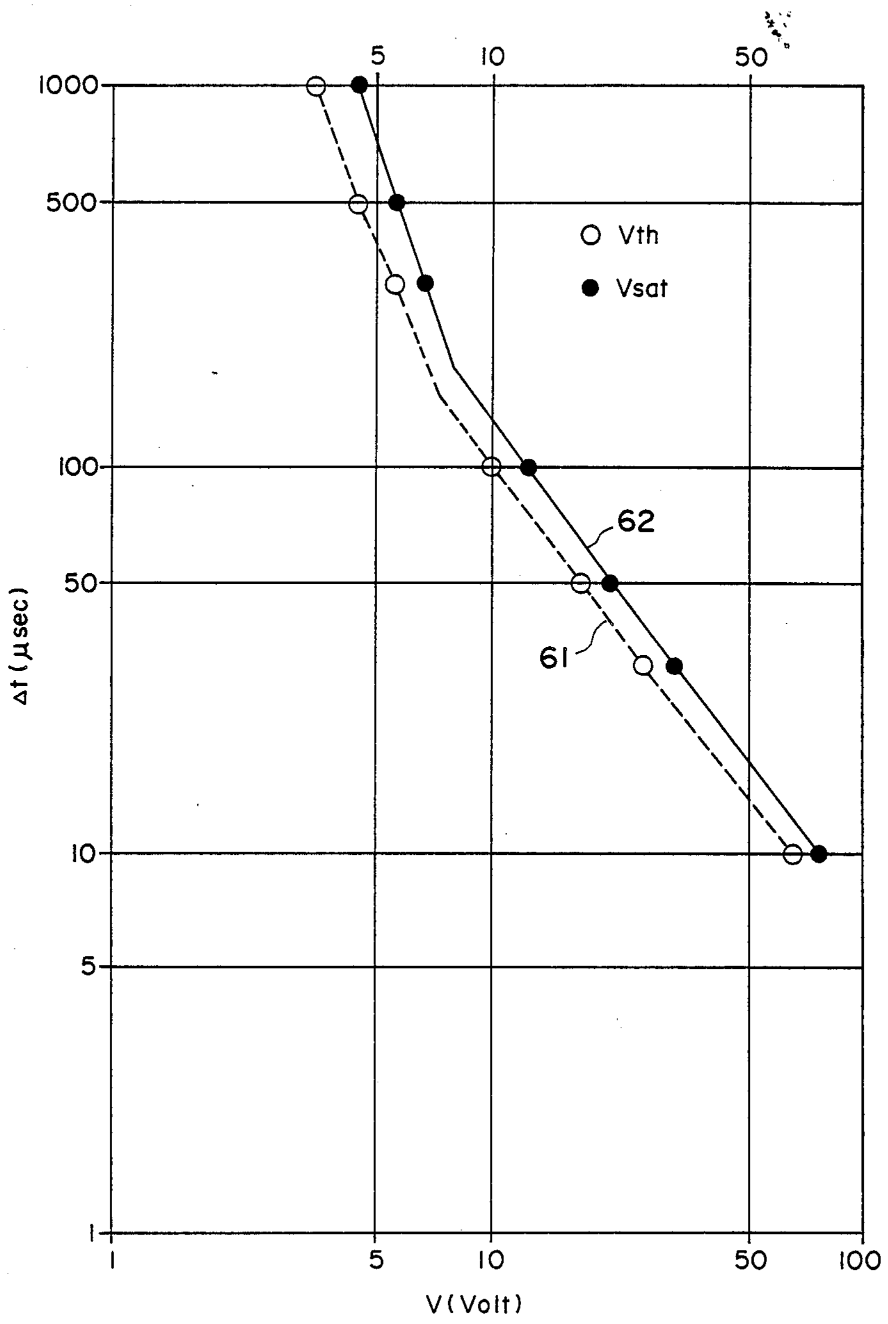
FIG. 6 is a graph showing a dependency of the inversion threshold voltage and the saturation threshold voltage of a ferroelectric liquid crystal cell on application time.

In the driving method according to the present invention, the voltage $V_R$ applied to a pixel $I_N$-$S_S$ in the line clear phase $t_1$ is so set as the exceed a saturation threshold voltage Vsat of the ferroelectric liquid crystal at a voltage application time thereof ($2\Delta t$ in FIGS. 1 and 2) which exceeds the minimum application time $\Delta t$. FIG. 6 shows characteristic curves showing the dependency of the saturation threshold voltage Vsat and the inversion threshold voltage Vth on the voltage application time. In FIG. 6, a curve 61 represents a characteristic curve of the inversion threshold voltage Vth, and a curve 62 represents a characteristic curve of the saturation threshold voltage Vsat.

Herein, the "inversion threshold voltage Vth" and the "saturation threshold voltage Vsat" are defined as follows. When a pixel placed under one optical state is supplied with a voltage of a polarity for providing the other optical state under a certain constant voltage application time, the optical factor (transmittance or interruption) of the pixel begins to cause an abrupt change at a certain voltage as denoted by Vth in FIG. 4 as the applied voltage increases and is saturated at another certain voltage as denoted by Vsat in FIG. 4. The "inversion threshold voltage Vth" is defined as the voltage at which the optical factor begins to cause an abrupt change, and the "saturation threshold voltage Vsat" is defined as the voltage at which the optical factor is saturated.

FIGS. 5A–5E are schematic views illustrating the change in orientation states in a pixel according to the increase in applied voltage. More specifically, FIG. 5A corresponds to a voltage a in FIG. 4, FIG. 5B to a voltage b in FIG. 4, FIG. 5C to a voltage c in FIG. 4, FIG. 5D to a voltage d in FIG. 4, and FIG. 5E to the saturation threshold voltage Vsat in FIG. 4. According to FIGS. 5A–5E, it is clarified that the area of black domains 51 is increased relative to the area of white domains 52 as the applied voltage increases.

Figure 2A:
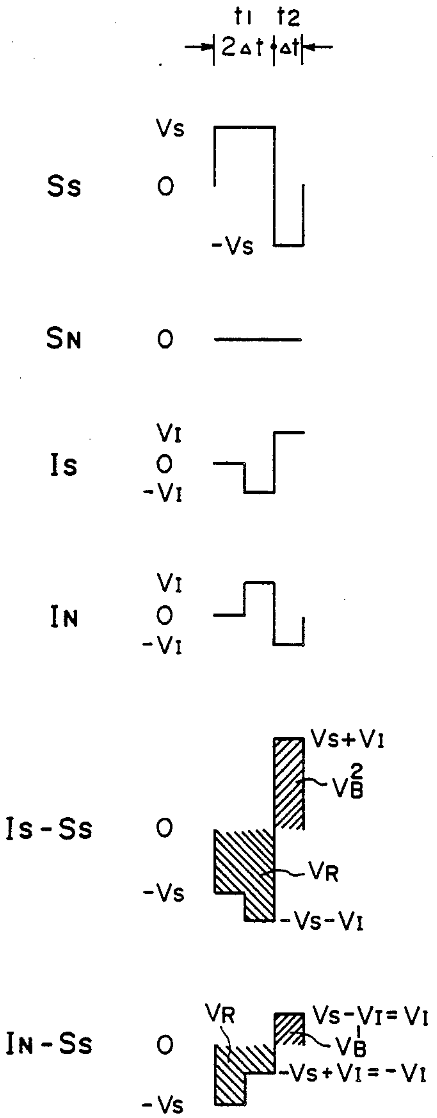
Figure 2B:
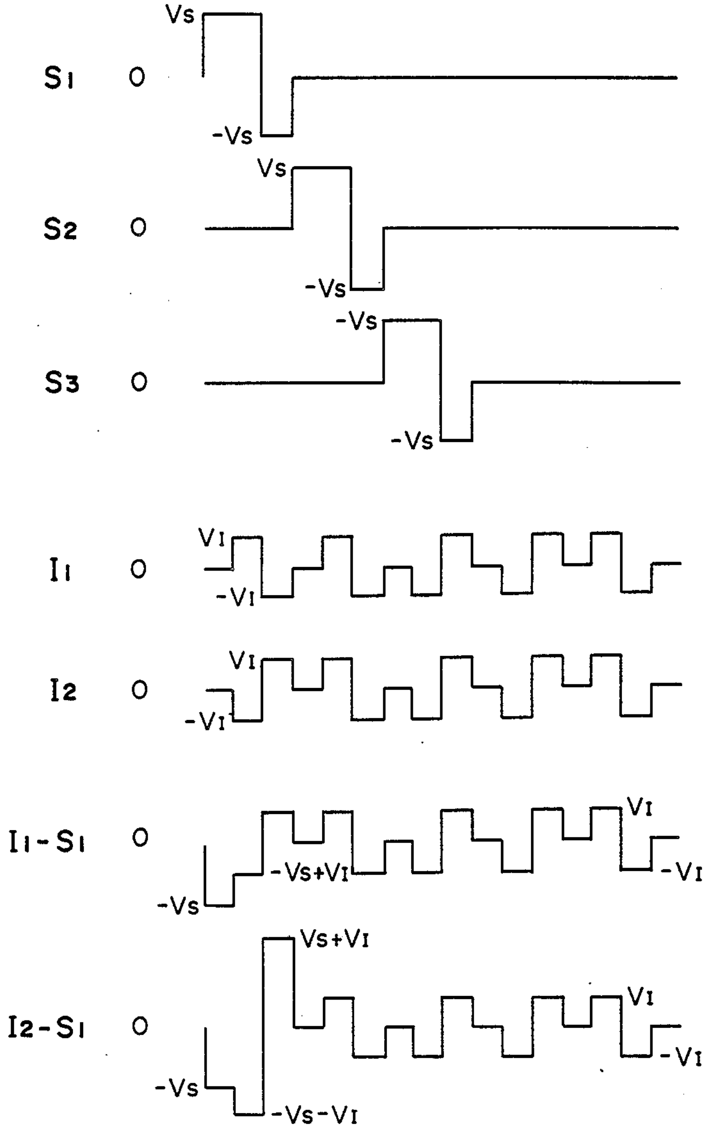
Figure 3:
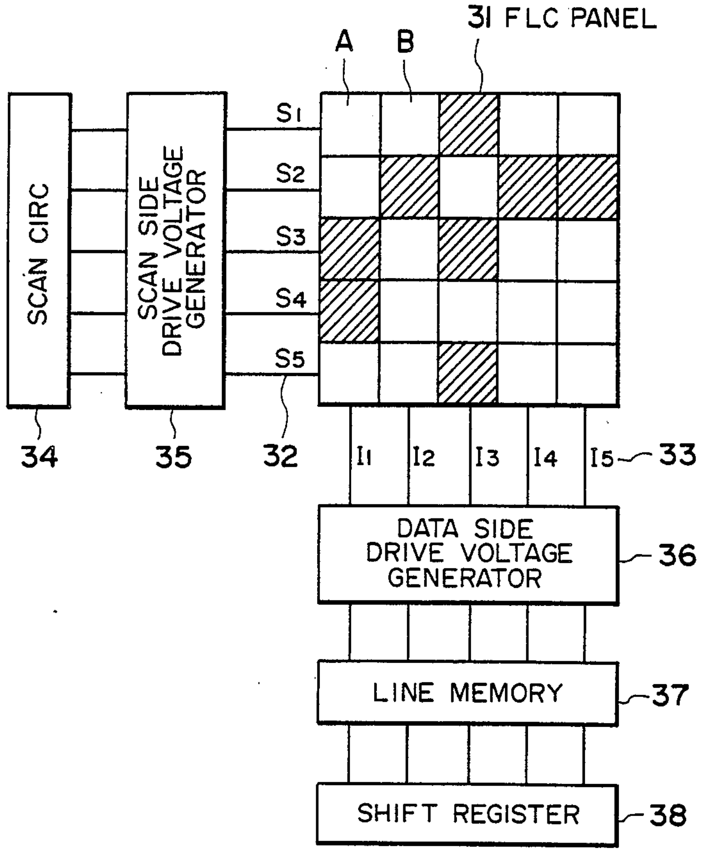
FIG. 3 is a plan view of a ferroelectric liquid crystal apparatus used in the present invention.

FIGS. 2A and 2B show another driving embodiment according to the present invention. In the embodiment shown in FIGS. 2A and 2B, the scanning selection signal at $S_S$ applied to a selected scanning line is an alternating voltage having voltages of $V_S$ and $-V_S$ (relative to the voltage level of a non-selected scanning line), and the amplitudes are set to be the same as each other so as to satisfy the relation of $|V_S|=|2\Delta V_I|$ with voltages $V_I$ and $-V_I$ applied to data lines.

Further, in the embodiment shown in FIGS. 2A and 2B, the voltage $V_R$ applied to a pixel $I_N$-$S_S$ in the line clear phase $t_1$ is set to exceed a saturation threshold voltage Vsat of the ferroelectric liquid crystal based on a voltage application time thereof (2Δt) set to two times the minimum application time Δt. The voltage $V_R$ have different magnitude levels of $-V_S$ and $-V_S+V_I=-V_I$. The respective magnitude levels are set to below a saturation threshold voltage Vsat based on the minimum application time Δt. For this reason, in the driving embodiment shown in FIG. 2, an effective bias voltage component of one polarity applied to a pixel is suppressed to a low level, and the voltage $V_S$ (and $-V_S$) used in the scanning selection signal voltage $S_S$ is also suppressed to a low level. As a result, the scanning side driver circuit is required to have only a low withstand voltage.

Incidentally, in case of displaying a picture like a television picture which varies time to time, it is necessary to effect the aforementioned refresh driving scheme even for a memory-type device such as a ferroelectric liquid crystal device as will be described hereinbelow. In the refresh driving scheme, it is desirable to suppress the effective bias voltage to the minimum in view of deterioration of liquid crystal materials and impairment of device characteristics.

According to our experiments, it has been discovered that, in the case of refresh driving, the voltage $V_R$ (applied to a pixel $I_N$-$S_S$) in the line clear phase $t_1$ or the voltage $V_B^2$ applied in the writing phase is not required to exceed the saturation threshold voltage Vsat based on the minimum application time Δt. More specifically, in the refresh driving wherein a scanning selection signal having the same phase of voltages is repeatedly applied for each frame or for each field, it is sufficient that the voltage $V_R$ (applied to a pixel $I_N$-$S_S$) and the voltage $V_B^2$ exceed the inversion threshold voltage Vth based on the minimum application time Δt. Accordingly, in the refresh driving of the present invention, the voltage $V_S$ or $V_{S1}$ of the scanning selection signal can be lower than the inversion threshold voltage Vth based on the minimum application time Δt. In this instance, $|V_S|$ or $|-V_{S1}|$ corresponds to the maximum amplitude $V_R^1$. As described above, it is particularly preferred in the present invention to satisfy the relation $V_R^1 \geqq |Vsat|/3$, wherein Vsat denotes the saturation threshold voltage based on the minimum application time Δt.

Figure 4:
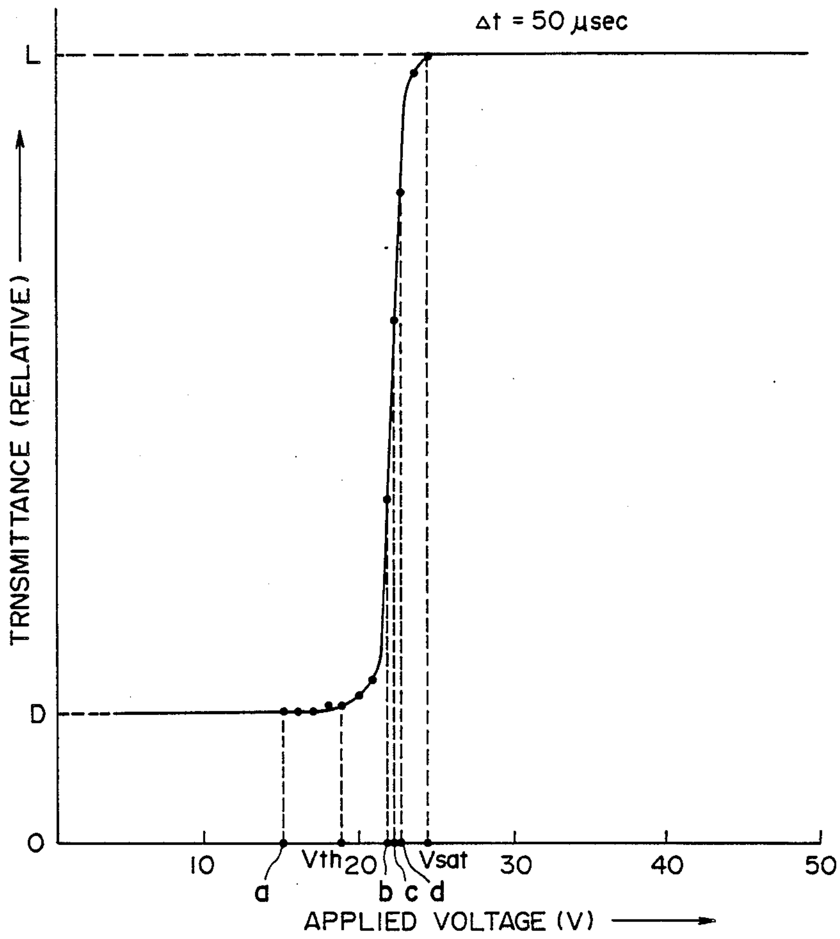
FIG. 4 is a graph showing a characteristic curve of transmittance versus voltage for a pixel.
Figure 5A:
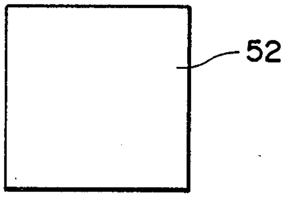
FIGS. 5A–5E are schematic views for illustrating corresponding states of domains in the pixel.
Figure 5B:
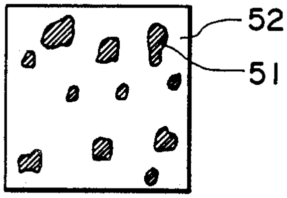
Figure 5C:
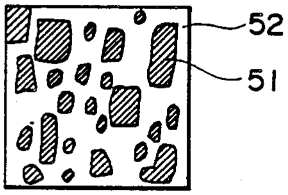
Figure 5D:
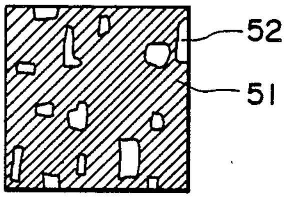
Figure 5E:
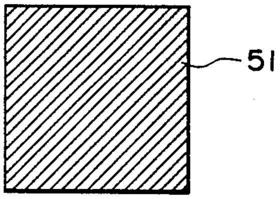

Incidentally, the data shown in FIGS. 4–6 is based on a liquid crystal cell having a gap of 1 μm filled with an ester-type mixture liquid crystal ("CS1014" available from Chisso K.K.) and provided with alignment control films comprising rubbed polyvinyl alcohol film. The liquid crystal material showed the following phase transition characteristic:

$$\text{Crystal} \xrightarrow{-21^\circ\text{ C.}} \text{SmC*} \xrightarrow{54.4^\circ\text{ C.}} \text{SmA} \xrightarrow{69.1^\circ\text{ C.}}$$

-continued $$\text{Ch.} \xrightarrow{80.5^\circ\text{ C.}} \text{Iso.,}$$

wherein the symbols denote the following phases:

SmC*: chiral smectic C phase,
SmA: smectic A phase,
Ch.: cholesteric phase, and
Iso.: isotropic phase.

In specific driving embodiments shown in FIGS. 1 and 2, the following voltages are used: $V_S^1=15$ V, $-10$ V, $|\pm V_1|=5$ V. Good display VS =15 V, -VS of a static picture was accomplished by using these voltages in both refresh driving and memory driving (after one frame period of writing, the applied voltages were released to provide a memory state.)

As an optical modulation material used in a driving method according to the present invention, a material showing at least two orientation states, particularly one showing either a first optically stable state or a second optically stable state depending upon an electric field applied thereto, i.e., bistability with respect to the applied electric field, particularly a liquid crystal having the above-mentioned property, may suitably be used.

Preferable liquid crystals having bistability which can be used in the driving method according to the present invention are chiral smectic liquid crystals having ferroelectricity. Among them, chiral smectic C (SmC*)- or H (SmH*)-phase liquid crystals ar suitable therefor. These ferroelectric liquid crystals are described in, e.g., "LE JOURNAL DE PHYSIQUE LETTRES", 36 (L-69), 1975 "Ferroelectric Liquid Crystals", "Applied Physics Letters" 36 (11) 1980, "Submicro Second Bistable Electrooptic Switching in Liquid Crystals"; "Kotai Butsuri (Solid State Physics)" 16 (141), 1981 "Liquid Crystal", U.S. Pats. Nos. 4561726, 4589996, 4592858, 4596667, 4613209, 4614609 and 4622165, etc. Ferroelectric liquid crystals disclosed in these publications may be used in the present invention.

More particularly, examples of ferroelectric liquid crystal compound used in the method according to the present invention include decyloxybenzylidene-p'-amino-2-methylbutylcinnamate (DOBAMBC), hexyloxybenzylidene-p'-amino-2-chloropropylcinnamate (HOBACPC), 4-O-(2-methyl)-butylresorcylidene-4'-octylaniline (MBRA8), etc.

When a device is constituted by using these materials, the device can be supported with a block of copper, etc., in which a heater is embedded in order to realize a temperature condition where the liquid crystal compounds assume an SmC*- or SmH*-phase.

Further, a ferroelectric liquid crystal formed in chiral smectic F phase, I phase, J phase, G phase or K phase may also be used in addition to those in SmC* or SmH* phase in the present invention.

Figure 7:
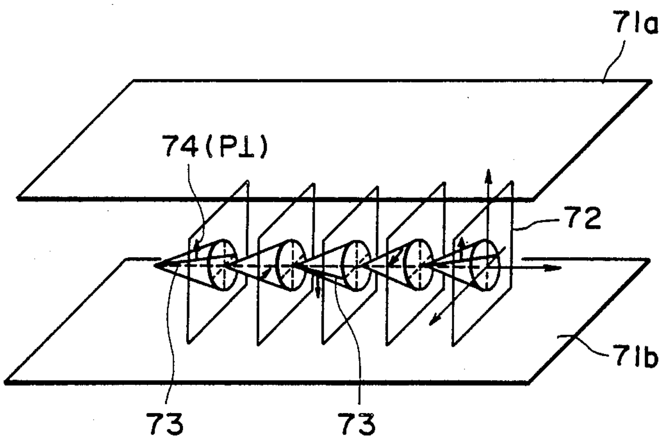
FIGS. 7 and 8 are respectively a schematic view illustrating the operation principle of a ferroelectric liquid crystal device used in the present invention.
Figure 8:
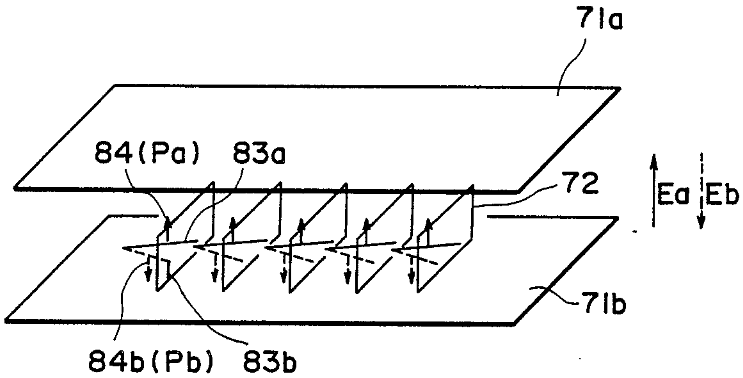

Referring to FIG. 7, there is schematically shown an example of a ferroelectric liquid crystal cell. Reference numerals 71*a* and 71*b* denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 72 are oriented perpendicular to surfaces of the glass plates is hermetically disposed therebetween. A full line 73 shows liquid crystal molecules. Each liquid crystal molecule 73 has a dipole moment (P⊥) 74 in a direction perpendicular to the axis thereof. When a voltage higher than a certain threshold level is applied between electrodes formed on the substrates 71*a* and 71*b*, a helical structure of the liquid crystal molecule 73 is unwound or released to change the alignment direction of respective liquid crystal molecules 73 so that the dipole moments (P⊥) 74 are all directed in the direction of the electric field. The liquid crystal molecules 73 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics such as contrast vary depending upon the polarity of an applied voltage. Further, when the thickness of the liquid crystal cell is sufficiently thin (e.g., 1μ), the helical structure of the liquid crystal molecules is unwound without application of an electric field whereby the dipole moment assumes either of the two states, i.e., Pa in an upper direction 84*a* or Pb in a lower direction 84*b* as shown in FIG. 8. When an electric field Ea or Eb higher than a certain threshold level and different from each other in polarity as shown in FIG. 8 is applied to a cell having the above-mentioned characteristics, the dipole moment is directed either in the upper direction 84*a* or in the lower direction 84*b* depending on the vector of the electric field Ea or Eb. In correspondence with this, the liquid crystal molecules are oriented to either of a first orientation state 83*a* and a second orientation state 83*b*.

When the above-mentioned ferroelectric liquid crystal is used as an optical modulation device, it is possible to obtain two advantages. First is that the response speed is quite fast. Second is that the orientation of the liquid crystal shows bistability. The second advantage will be further explained, e.g., with reference to FIG. 8. When the electric field Ea is applied to the liquid crystal molecules, they are oriented to the first orientation state 83*a*. This state is stably retained even if the electric field is removed. On the other hand, when the electric field Eb of which the direction is opposite to that of the electric field Ea is applied thereto, the liquid crystal molecules are oriented to the second orientation state 83*b*, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ.

As explained hereinabove, according to the present invention, crosstalk-free driving as described can be realized, and a driving operation suited for the refreshing scheme with a reduced effective bias voltage is realized.

What is claimed is:

1. A driving method for an optical modulation device comprising a plurality of scanning lines and a plurality of data lines intersecting with the scanning lines to form a matrix of pixels each formed at an intersection of the scanning lines and the data lines, each pixel assuming either a first optical state or a second optical state depending on the direction of an electric field applied thereto; said driving method comprising:

applying a scanning selection signal to a scanning line to select the scanning line in a scanning selection period including a former phase and a latter phase having a duration smaller than that of the former phase, said scanning selection signal having a voltage of one polarity at the former phase and a voltage of the other polarity at the latter phase wherein the time duration of the applied voltage of one polarity at the former phase is longer than the time duration of the applied voltage of the other polarity at the latter phase; and applying a data signal to data lines in synchronism with the scanning selection signal, said data signal having a voltage of zero at a part of the former phase, a voltage of one or the other polarity at another part of the former phase, and a voltage of a polarity opposite to said one or the other polarity at the latter phase, with said voltages of zero, and one and the other polarities being defined with respect to the voltage level of a non-selected scanning line, so as to apply to all or a prescribed part of the pixels on the selected scanning line a voltage of one polarity providing the first optical state to all or a prescribed part of the pixels at the former phase, apply to a selected pixel among all or a prescribed part of the pixels a voltage of the other polarity providing the second optical state, and to the remaining pixels a voltage not changing an optical state at the latter phase, and apply to the pixels on a non-selected scanning line a voltage not changing an optical state and having an average value of zero.

2. A method according to claim 1, wherein the scanning selecting signal is sequentially applied to the scanning lines in a prescribed period, and the prescribed period of operation is cyclically repeated.

3. A method according to claim 1, wherein the duration of said former phase is in the range of 2Δt to 10Δt when the duration of said latter phase is defined as Δt.

4. A method according to claim 1, wherein the duration of said former phase is 2Δt.

5. A method according to claim 1, wherein an optical modulation material showing a first orientation state or a second orientation state depending on an electric field applied thereto is disposed at each intersection of the scanning lines and data lines.

6. A method according to claim 5, wherein said optical modulation material is a ferroelectric liquid crystal.

7. A method according to claim 6, wherein said ferroelectric liquid crystal is a chiral smectic liquid crystal.

8. A method according to claim 7, wherein said chiral smectic liquid crystal is disposed in a layer thin enough to release its helical structure.

9. A method according to claim 8, wherein said chiral smectic liquid crystal is in chiral smectic C phase or H phase.

10. An optical modulation apparatus, comprising:

an optical modulation device comprising a plurality of scanning lines and a plurality of data lines intersecting with the scanning lines to form a matrix of pixels each formed at an intersection of the scanning lines and the data lines, each pixel assuming either a first optical state or a second optical state depending on the direction of an electric field applied thereto;

a scanning-side driving voltage generating circuit for supplying a scanning signal to the scanning lines; and a data-side driving voltage generating circuit for supplying information signals to the data lines, wherein said scanning-side driving voltage generating circuit comprises means for periodically supplying a scanning selection signal voltage and a scanning non-selection signal voltage, the scanning selection signal voltage comprising a voltage of one polarity and a voltage of the other polarity with respect to the scanning non-selection signal voltage in a first phase and a second phase, respectively, with the application time of said voltage of one polarity being 2Δt or longer if the application time of said voltage of the other polarity is denotes by Δt, and said data-side driving voltage generating circuit comprises means for supplying, in synchronism with the scanning selection signal, a signal voltage comprising a voltage of zero and one or the other polarity with respect to the scanning non-selection voltage in said first phase, which provides a voltage of one polarity causing one optical state of a pixel to all or a prescribed part of the pixels on a selected scanning line, and a voltage of a polarity opposite to said one or the other polarity at said second phase, which provides a voltage of the other polarity causing the other optical state of a pixel to a selected pixel among all or prescribed part of the pixels or a voltage not changing an optical state of a pixel to the remaining pixels.

11. An apparatus according to claim 10, wherein said scanning-side driving voltage generating circuit includes mean for cyclically supplying the scanning signal to the scanning lines.

12. An apparatus according to claim 10, wherein the application of said voltage of one polarity in the scanning selection signal is 2Δt.

13. An apparatus according to claim 10, wherein said optical modulation device comprises a ferroelectric liquid crystal.

14. An apparatus according to claim 13, wherein said ferroelectric liquid crystal is a chiral smectic liquid crystal.

15. An apparatus according to claim 14, wherein said chiral smectic liquid crystal is disposed in a layer thin enough to release its helical structure in the absence of an electric field.

* * * * *

UNITED STATES PATENT AND TRADEMARK OFFICE
CERTIFICATE OF CORRECTION

PATENT NO. : 4,927,243

DATED : May 22, 1990

INVENTOR(S) : Osamu Taniguchi, et al.

It is certified that error appears in the above-identified patent and that said Letters Patent is hereby corrected as shown below:

COLUMN 2:

Line 47,"$V_{SA}$" should read --Vsat--.

COLUMN 6:

Line 11, "-10" should read -- $-V_s^2 = -10$--.

Line 12, "VS = 15 V, -VS" should be deleted.

COLUMN 9:

Line 14, "denotes" should read --denoted--.

Signed and Sealed this

Eighth Day of December, 1992

Attest:

DOUGLAS B. COMER

*Attesting Officer*

*Acting Commissioner of Patents and Trademarks*